United States Patent [19]

Wojtowicz

[11] 3,927,074
[45] Dec. 16, 1975

[54] PREPARATION OF HALOBUTYRATE ESTERS

[75] Inventor: John A. Wojtowicz, Chesire, Conn.

[73] Assignee: Olin Corporation, New Haven, Conn.

[22] Filed: June 19, 1974

[21] Appl. No.: 476,347

[52] U.S. Cl. .............................. 260/487; 260/487
[51] Int. Cl.$^2$ ........................................ C07C 69/63
[58] Field of Search .................................. 260/487

[56] References Cited
UNITED STATES PATENTS

| 2,352,641 | 7/1944 | Küng .................................. 260/535 |
| 2,411,875 | 12/1946 | Gresham et al. ................. 260/544 Y |
| 2,422,728 | 6/1947 | Gresham et al. ..................... 260/487 |
| 3,120,538 | 2/1964 | Strating ........................ 260/293.55 |

OTHER PUBLICATIONS

Chemical Abstracts, Vol. 45, 8031c, (1951), [Abstract of German patent 804,567, Apr. 26, 1951].

Migrdichian, Organic Synthesis, Vol. I, p. 319, (1957).
March, Advanced Organic Chemistry: Reactions, Mechanisms, and Structure, pp. 343 and 344 (1968).
Chemical Abstracts, Vol. 79, 125773s, (Nov. 26, 1973).
Chemical Abstracts, Vol. 71, 101333g, (1969).
Meincke et al., J. Am. Chem. Soc., Vol. 57, pp. 1443–1445 (1935).
Gresham et al., J. Am. Chem. Soc., Vol. 72, pp. 72–74, (1950).

Primary Examiner—Lorraine A. Weinberger
Assistant Examiner—Jane S. Myers
Attorney, Agent, or Firm—Kenneth P. Glynn; Eugene Zagarella, Jr.

[57] ABSTRACT

A novel method of preparing halobutyrate esters is provided by reacting β-butyrolactone with selected inorganic halides in the presence of a lower alkanol.

9 Claims, No Drawings

PREPARATION OF HALOBUTYRATE ESTERS

This invention involves a method for preparing halobutyrate esters in a novel and improved method wherein γ-butyrolactone is reacted with a selected inorganic halide in the presence of a lower alkanol.

The halobutyrate esters have previously been prepared, as disclosed in U.S. Pat. No. 3,711,549 (issued Jan. 16, 1973 and entitled "Process for Manufacturing Cyclopropylamine"), by reacting, for example, γ-butyrolactone with anhydrous hydrogen chloride under pressure to form 4-chlorobutyric acid which may then be esterified with methanol to form methyl 4-chlorobutyrate. This technique, however, has the disadvantage of involving multiple steps and also the necessity of high pressure and temperature in one of the preparation steps.

Now it has been found that halobutyrate esters can be prepared in a simplified and economical one-step method wherein γ-butyrolactone is reacted with an inorganic halide in the presence of lower alkanol. Thus, this method may be illustrated by the following equation wherein γ-butyrolactone is reacted with thionyl chloride in the presence of methanol to form methyl 4-chlorobutyrate.

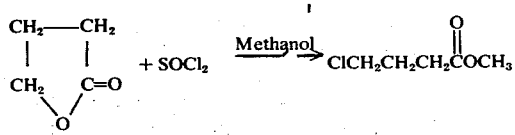

The halobutyrate esters prepared by the method of this invention have the formula:

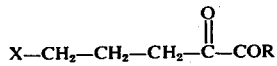   (I)

wherein R is an alkyl group of 1 to 4 carbon atoms, preferably 1 to 3 and more preferably 1 carbon atom, and X is a halogen selected from the group consisting of chlorine, bromine, iodine, and fluorine, with chlorine and bromine being preferred and chlorine being most preferred.

A wide variety of inorganic halides may be used in the method of this invention. Useful halides include the halides and/or oxyhalides of sulfur, phosphorus, aluminum, iron, boron, silicon, tin, arsenic, antimony, bismuth, selenium, tellurium, germanium, titanium, and chromium. More particularly, the halides which may be used in the method of this invention are the halides and oxyhalides of sulfur, phosphorus, arsenic, antimony, bismuth, selenium, and tellurium; the halides of boron, silicon, germanium, titanium, tin, aluminum and iron and the oxyhalides of chromium. Halides as referred to above include all the halogens, i.e., chlorine, bromine, iodine, and fluorine except in the case of the halides of aluminum and iron which include only chlorine, bromine, and iodine. The preferred halides are the halides or oxyhalides of sulfur, phosphorus, aluminum, iron, boron, silicon, and tin with sulfur and phosphorus being most preferred. while all the halogens of the above elements may be used, chlorine and bromine are preferred with chlorine bring most preferred because of economics and the more ready availability.

The above inorganic halides include for example, the halides and oxyhalides of As(III), Sb(III), Bi(III), P(V), S(IV), Se(IV), and Te(IV); the halides of As(V), Sb(V), Bi(V), B, P(III), S(II & IV), Se(II & IV), Te(II & IV), Si(IV), Ge(IV), Ti(IV), Sn(IV), and the chlorine, bromine and iodine compounds of Al(III), and Fe(III); the oxyhalides of S(VI), Se(VI), Te(VI), and Cr. The following are specific illustrations of the halides of this invention:

thionyl chloride ($SOCl_2$), thionyl bromide ($SOBr_2$), thionyl iodide ($SOI_2$), thionyl fluoride ($SOF_2$), phosphorus trichloride ($PCl_3$), phosphorus tribromide ($PBr_3$), phosphorus oxychloride ($POCl_3$), arsenic trichloride ($AsCl_3$), arsenic triiodide ($AsI_3$), arsenic trifluoride ($AsF_3$), antimony trichloride ($SbCl_3$), antimony tribromide ($SbBr_3$), antimony oxychloride ($SbOCl$), antimony pentachloride ($SbCl_5$), aluminum chloride ($AlCl_3$), aluminum iodide ($AlI_3$), boron trichloride ($BCl_3$), boron trifluoride ($BF_3$), silicon tetrachloride ($SiCl_4$), titanium tetrachloride ($TiCl_4$), ferric chloride ($FeCl_3$), ferric bromide ($FeBr_3$), selenium tetrachloride ($SeCl_4$), tellurium tetrachloride ($TeCl_4$), germanium tetrachloride ($GeCl_4$), bismuth trichloride ($BiCl_3$), and chromyl chloride ($CrO_2Cl_2$). Thionyl chloride is a particularly preferred halide.

The alkanol or aliphatic alcohols which may be used in the method of this invention are the lower alkanols having 1 to 4 carbon atoms, preferably 1 to 3 and more preferably 1 carbon atom. Illustrative of such alkanols are the following: methanol, ethanol, n-propyl alcohol, isopropyl alcohol, n-butyl alcohol, sec-butyl alcohol, and tert-butyl alcohol.

The reaction conditions of temperature and pressure may be varied depending on the particular halide that is used. The reaction is exothermic and may generally be carried out at a temperature of about 10° to about 150°C. with about 20° to about 35°C. or ambient (room) temperature being preferred. The reaction may generally be performed under a pressure of about 0.1 to about 10 atmosphere with atmospheric pressure being preferred.

The amount of inorganic halide may be varied from about 1 to about 2 moles of halide per mole of γ-butyrolactone and preferably from about 1.2 to about 1.6. The amount of alcohol may be varied from about 1 to about 10 moles of alcohol per mole of γ-butyrolactone and preferably from about 1.4 to about 2.2.

While it is not necessary to use a solvent, a variety of non-reactive solvents such as aliphatic or aromatic hydrocarbons, chlorinated hydrocarbons, ethers and cyclic ethers may be used if desired.

The halobutyrate esters (I) prepared by the method of this invention are useful as intermediates in the preparation of biologically active compounds. More particularly, the esters (I) may be used to prepare cyclopropylamine by converting the ester to the corresponding cyclopropanecarboxylate by ring closure with sodium methylate and then converting to the corresponding amide by reaction with ammonia. The amide is then converted to the amine by treatment with sodium hypochlorite (Hoffman reaction). This procedure is disclosed in the above-noted U.S. Pat. No. 3,711,549. The cyclopropylamine may then be converted to triazine derivatives by reaction with cyanuric chloride as shown in the U.S. Pat. No. 3,711,549. These triazine derivatives are useful as herbicides, e.g., Cyprazine (2-chloro-4-cyclopropyl amino -6-isopropylamino-1,3,5-triazine) which is prepared from cyclopropylamine, is a selective post emergence herbicide used for controlling a variety of weeds (See Agricultural Chemicals — Book II, 1973 revision, Herbicides by W. T. Thomson).

The following examples are presented to further illustrate the invention without any intention of being limited thereby.

EXAMPLE I

A glass reaction vessel was charged with 86.1 g (1.0 mole) of γ-butyrolactone and 32.1 g (1.0 mole) of methanol. Thionyl chloride (119.0 g, 1.0 mole) was added at a uniform rate over a 1 hour period maintaining the temperature between 25° to 35°C. by external cooling. The evolved HCl and $SO_2$ were absorbed in aqueous caustic.

After the evolution of gas subsided, additional methanol (6.4 g, 0.20 mole) was added followed by the addition of thionyl chloride (11.9, 0.1 mole). The addition of extra methanol (0.2 mole) and thionyl chloride (0.1 mole) was repeated two more times. The temperature of the reaction mixture was increased slowly, while maintaining a slow nitrogen flush (temperature did not exceed 90°–95°C). The reaction mixture was then cooled to ambient temperature and vacuum (20 to 25 Torr) applied.

The temperature was slowly increased until the pot attained 70°C. and the head temperature reached 50° to 60°C. under total reflux. The stripped crude product weighed 138.6 g and had the following analysis as determined by gas chromatography:

|  | Weight Percent |
|---|---|
| Methyl 4-chlorobutyrate | 94.0 |
| γ-butyrolactone | 0.8 |
| Low boilers | 2.4 |
| High boilers | 2.8 |

This represented a yield of 95.4%, a conversion of 98.7% and a selectivity of 96.7%.

EXAMPLE II

To a mixture of 0.86 g (0.01 mole) of γ-butyrolactone and 0.65 g (0.016 mole) of methanol, 1.37 g (0.01 mole) of $PCl_3$ was added slowly over about a ten-minute period with the heat of reaction removed by external cooling. The reaction was analyzed by gas chromatography and it was found that the γ-butyrolactone was converted to methyl 4-chlorobutyrate in high selectivity.

EXAMPLE III

The same procedure as Example II was followed using 1.54 g (0.01 mole) of $POCl_3$ instead of $PCl_3$. Analysis showed conversion to methyl 4-chlorobutyrate in high selectivity.

EXAMPLE IV

The same procedure as Example II was followed using 1.70 g (0.01 mole) of $SiCl_4$ instead of $PCl_3$. Analysis showed conversion to methyl 4-chorobutyrate in high selectivity.

EXAMPLE V

The same procedure as Example II was followed using 1.33 g (0.01 mole) of $AlCl_3$ instead of $PCl_3$. Analysis showed conversion to methyl 4-chorobutyrate in high selectivity.

What is claimed is:

1. A method for preparing halobutyrate esters of the formula X—$CH_2$—$CH_2$—$CH_2$—COOR, wherein R is an alkyl group of 1 to 4 carbon atoms and X is a halogen selected from the group consisting of chlorine, bromine, iodine and fluorine, consisting essentially of reacting γ-butyrolactone with from about 1 to about 2 moles of an inorganic halide, per mole of γ-butyrolactone, in the presence of from about 1 to about 10 moles of an alkanol having 1 to 4 carbon atoms, per mole of γ-butyrolactone, at a temperature of about 10° to about 150°C. and a pressure of about 0.1 to about 10 atmospheres, the inorganic halide being selected from the group consisting of:
   a. the halides and oxyhalides of sulfur, phosphorous, arsenic, antimony, bismuth, selenium, and tellurium;
   b. the halides of boron, silicon, germanium, titanium, tin, aluminum, and iron and
   c. the oxyhalides of chromium the halogen in said inorganic halide being selected from the group consisting of chlorine, bromine, iodine, and fluorine with the proviso that when aluminum and iron are used, said halogen is selected from the group consisting of chlorine, bromine, and iodine.

2. The method of claim 1 wherein said inorganic halide is selected from the group consisting of the halides and oxyhalides of sulfur and phosphorus and the halides of aluminum, iron, boron, silicon, and tin.

3. The method of claim 2 wherein said alkanol has 1 to 3 carbon atoms and the halogen in said inorganic halide is chlorine or bromine.

4. The method of claim 3 wherein said halide is selected from the group consisting of thionyl chloride, phosphorus trichloride, phosphorus oxychloride, aluminum trichloride and silicon tetrachloride.

5. The method of claim 3 wherein said inorganic halide is selected from the group consisting of the halides and oxyhalides of sulfur and phosphorus.

6. The method of claim 5 wherein from about 1.2 to about 1.6 moles of halide per mole of γ-butyrolactone and from about 1.4 to about 2.2 moles of alkanol per mole of γ-butyrolactone are used.

7. The method of claim 5 wherein the halogen in said inorganic halide is chlorine and said alkanol is methanol.

8. The method of claim 7 wherein said halide is thionyl chloride.

9. The method of claim 8 wherein from about 1.2 to about 1.6 moles of halide per mole of γ-butyrolactone and from about 1.4 to about 2.2 moles of alkanol per mole of γ-butyrolactone are used.

* * * * *